(12) United States Patent
Poisel et al.

(10) Patent No.: US 7,020,378 B2
(45) Date of Patent: Mar. 28, 2006

(54) DEVICE FOR PRODUCING A WHITE LIGHT

(75) Inventors: Hans Poisel, Leinburg (DE); Thomas Herberger, Forchheim (DE)

(73) Assignee: WaveLight Laser Technologie AG, Erlangen (DE)

( * ) Notice: Subject to any disclaimer, the term of this patent is extended or adjusted under 35 U.S.C. 154(b) by 232 days.

(21) Appl. No.: 10/468,165

(22) PCT Filed: Feb. 22, 2002

(86) PCT No.: PCT/EP02/01905

§ 371 (c)(1),
(2), (4) Date: Aug. 13, 2003

(87) PCT Pub. No.: WO02/070948

PCT Pub. Date: Sep. 12, 2002

(65) Prior Publication Data

US 2004/0076395 A1    Apr. 22, 2004

(30) Foreign Application Priority Data

Mar. 1, 2001 (DE) ............................... 101 09 850

(51) Int. Cl.
*G02B 6/00* (2006.01)
(52) U.S. Cl. ..................... 385/141; 385/142

(58) Field of Classification Search ......... 385/141–143
See application file for complete search history.

(56) References Cited

U.S. PATENT DOCUMENTS

| | | | | |
|---|---|---|---|---|
| 5,579,429 A | * | 11/1996 | Naum | 385/143 |
| 6,270,244 B1 | * | 8/2001 | Naum | 362/583 |
| 6,272,269 B1 | * | 8/2001 | Naum | 385/43 |
| 6,519,401 B1 | * | 2/2003 | Imamura et al. | 385/123 |

FOREIGN PATENT DOCUMENTS

| | | |
|---|---|---|
| DE | 195 31 455 A1 | 2/1997 |
| DE | 198 53 106 A1 | 5/2000 |
| EP | 0 280 584 | 8/1988 |
| EP | 0 982 924 A2 | 3/2000 |

* cited by examiner

*Primary Examiner*—John D. Lee
*Assistant Examiner*—Kevin S. Wood
(74) *Attorney, Agent, or Firm*—Haynes and Boone, LLP

(57) ABSTRACT

A device for the generation of white light serves in particular for the illumination of the interior of the eye. A semiconductor laser (10') emits radiation in the blue/violet/ultraviolet region of the spectrum, which is coupled into an optical waveguide (18'). The optical waveguide (18') is doped with fluorescent dyes (26). By superposition of the fluorescent radiations white light is generated at the end (22') of the optical waveguide.

20 Claims, 1 Drawing Sheet

DEVICE FOR PRODUCING A WHITE LIGHT

Figure 1:
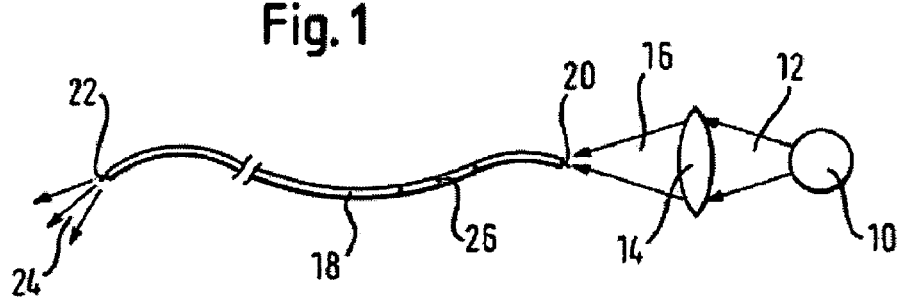

The invention relates to a device for producing white light. The term white light as used herein refers in particular to electromagnetic radiation in the visible region of the spectrum, which is spectrally composed in such a manner that at least approximately the visual perception of white light is achieved.

White light is frequently used in particular for illuminating the interior of the eye. For this purpose, a fine optical waveguide with e.g. a diameter of less than one millimetre (preferably less than 0.7 mm) is inserted into the interior of the eye. Such an optical waveguide has a numerical aperture of e.g. 0.37. For diagnostic purposes, an illumination of up to 100,000 lux is generally required in the inter In the state of the art incandescent or discharge lamps are known for the generation of white light. Though such lamps are sufficiently powerful, they have, however, several technical problems, i.e. in particular the development of a high amount of heat, a large size, a change in the hue of white upon a change in power, a poor coupling efficiency into an optical waveguide, expensive power electronics in the case of discharge lamps, and generally a short life.

It is also known in the state of the art to generate white light by additive mixing (superposition) of two or three basic colours and to use light-emitting diodes (LED's) or lasers for this purpose. For the time being, LED's still have too low an illumination power, and lasers as diodes (semiconductor lasers) are not yet available in all necessary colours and power levels. Other laser types, such as solid-state lasers or gas lasers, are very expensive.

The invention is based on the object to provide a white light source which at least partially alleviates the above mentioned problems of the state of the art.

The inventive white light source comprises at least one semiconductor laser which emits radiation in the blue and/or violet and/or ultraviolet region of the spectrum and at least one optical waveguide for the generation of white light, into which the radiation of the semiconductor laser is at least partially coupled, with the optical waveguide being doped with fluorescent dyes which may be excited directly or indirectly by the laser radiation in such a manner that by superposition (mixing) of various radiation components white light is emitted at the end of the optical waveguide. The white light generation may be effected with or without the inclusion of the excitation radiation.

According to a preferred embodiment, a further optical waveguide which is flexible is to be connected downstream of the optical waveguide provided for the generation of white light. This further optical waveguide is selected in such a manner that it can carry at least the frequencies (modes) of the upstream optical waveguide. It may also have a higher numerical aperture (NA).

A further embodiment of the device provides for the optical waveguide intended for the generation of white light to have a diameter of less than 1000 μm.

It is preferred to provide an active optical waveguide in which the white light is generated by means of radiation superposition, and to connect a passive optical waveguide/downstream of this active optical waveguide, which is preferably highly flexible and has a small diameter, e.g. of less than 0.7 mm. According to a preferred embodiment, this passive optical waveguide may, for example, be adapted for insertion into the interior of the eye. It may be configured as a so-called "disposable article".

According to a variant of the invention it is provided that the optical waveguide for the generation of white light is doped with a plurality of different fluorescent dyes which fluoresce in different regions of the spectrum.

It is also possible to provide several parallel optical waveguides for the generation of white light. The different optical waveguides may then be doped with different fluorescent dyes.

It is also possible to provide several semiconductor lasers whose radiations are coupled into one or several fibres, whereby it may be provided in particular that the individual fibres are doped with different fluorescent dyes.

The invention also includes the application of one of the above described devices as a white light source for the illumination of the interior space of the eye.

The advantages of the above described inventive devices are a compact size, a high robustness against de-adjustments, a low development of heat, an easy-to-adjust illumination power, an easy-to-adjust hue of white, and a simple interface (coupling) between the white light source and a possibly additionally used optical waveguide.

Figure 2:
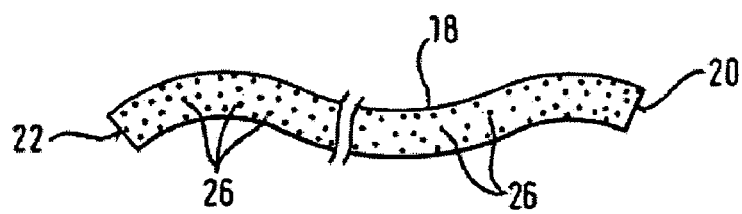
Figure 3:
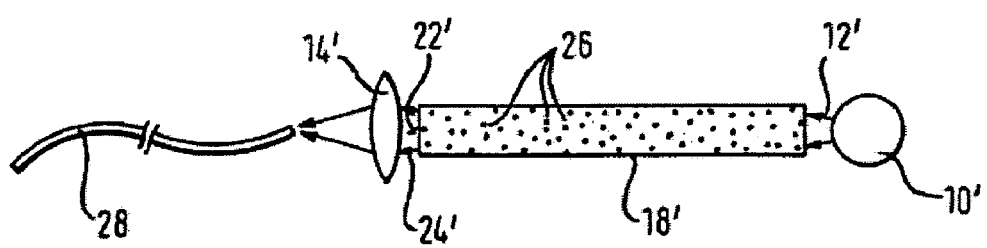
Figure 4:
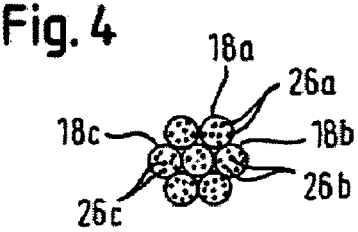

Embodiments of the invention will be described in the following with reference to the drawing in which:

FIG. 1 schematically shows a first embodiment of a device for the generation of white light;

FIG. 2 shows a portion of an optical waveguide of the device according to FIG. 1 in an enlarged scale;

FIG. 3 schematically depicts a second embodiment of a device for the generation of white light; and FIG. 4 illustrates a section through another embodiment of a device for the generation of white light with several optical waveguides.

In the embodiment according to FIG. 1 a semiconductor laser 10 (a laser diode LD) is provided which emits in the blue/violet region of the spectrum. It serves as a pump light source. The radiation characteristic (direction characteristic of the emitted radiation) of laser diodes is relatively highly aligned so that approx. 90% or more of the emitted electromagnetic radiation can be coupled into an optical waveguide without significant losses. The blue and/or violet and/or ultraviolet radiation emitted by the semiconductor laser 10 is coupled into an optical waveguide 18 via a coupling optics 14 (in FIG. 1 shown only schematically). The radiation enters into the optical waveguide 18 through the inlet 20 and leaves it through the outlet 22. In the embodiment according to FIG. 1 the optical waveguide 18 has been doped by a plurality of fluorescent dye molecules 26 which may be excited by the laser radiation 16 in such a manner that they fluoresce in the visual region of the spectrum (visible for the human eye). The fluorescent dyes 26 in the optical waveguide 18 are selected in such a manner that by superposition of all spectral components white light 24 is emitted at the end 22 from the optical waveguide 18.

The fluorescent dyes and the laser radiation 16 of the semiconductor laser 10 may be so selected that the laser radiation directly excites all dyes. It is also possible to match the fluorescent dye molecules and the laser radiation in such a manner that the fluorescent light of the one dye serves as a pump light for another dye and so forth. The dyes and the laser light as well as the parameters of the optical waveguide may also be matched to one another in such a manner that the laser radiation 16 is not fully absorbed by the fluorescent dyes but also contributes a spectral component to the white light at the end 22 of the optical waveguide.

FIG. 2 illustrates the optical waveguide 18 of the device according to FIG. 1 in an enlarged scale, with the doping with fluorescent dye molecules 26 being schematically indicated.

FIG. 3 shows a further embodiment of a device for the generation of white light, wherein the function of the optical waveguide for the generation of white light, on the one hand, and of an optical waveguide, on the other hand, for coupling the white light, for example, into the interior space of the eye are separate from one another. This allows to optimally select the optical waveguides for the respective purpose. In the embodiment according to FIG. 3 the blue and/or violet and/or ultraviolet radiation 12' emitted by a semiconductor laser 10' is directly or indirectly coupled into an optical waveguide 18' via a coupling optics, which is doped with fluorescent dyes 26. The white light radiation 24' emitted at the end 22' of the optical waveguide 18' is coupled into one end of an optical waveguide 28 via a coupling optics 14'. The diameter of the optical waveguide 28 is small enough to allow its insertion into the interior space of the eye. In this embodiment the optical waveguide 28 need not be doped with fluorescent dyes.

In the embodiment according to FIG. 3 different fluorescent dyes may be provided in the optical waveguide 18' or 18, respectively, as in the case of the embodiment according to FIGS. 1 and 2, so that by matching the concentration of the fluorescent dye molecules in the optical waveguide, the length of the optical waveguide, and the emitted laser radiation at the end of the optical waveguide the desired white light is generated.

The advantage of the arrangements shown in FIGS. 1 and 3 is, i.a. that only one laser diode 10 is required whose radiation which is achieved with a high efficiency can easily be coupled, again with a high efficiency, into the optical waveguide. This allows a variation of the white light hue and thus a change of the colour perception of the emitted light in a simple manner by e.g. changing the pumping power of the semiconductor laser or also by varying the fibre length.

In order to achieve a satisfactory spatial mixture of the spectral components the optical waveguides may be provided with suitable cross-sections, e.g. with a hexagonal cross-section.

An increase in efficiency of the entire device according to FIGS. 1 and 3 can be achieved by colour-selectively metallising the inlet area of the optical waveguide 18 or 18', respectively; in such a manner that essentially only the pump light from the laser is transmitted while the fluorescent light is reflected. Both the pump light and the fluorescent light are reflected from the inner surfaces of the optical waveguide. For increasing the efficiency, the reflecting surfaces may be metallised.

FIG. 4 schematically shows a variant of the device for the generation of white light. In this variant, several optical waveguides 18a, 18b, 18c (and more) are arranged in parallel i.e. FIG. 4 is a cross-section perpendicular to the longitudinal axes of the optical waveguides. Otherwise, the arrangement principally corresponds to that of the devices according to FIGS. 1 and 3. The optical waveguides 18a, 18c, 18c according to FIG. 4 thus substitute the optical waveguide 18 of FIG. 1 or the optical waveguide 18', respectively, of FIG. 3.

In the embodiment according to FIG. 4 each of the individual optical waveguides 18a, 18b, 18c may be provided with different fluorescent dyes 26a, 26b, 26c so that at the emitting ends of the optical waveguides all fluorescent radiations are superposed (mixed) in order to generate the white light.

In the embodiment according to FIG. 4, as well as in the embodiments according to FIGS. 1 and 3, each optical waveguide may be doped with different fluorescent dyes so that altogether the desired white light is obtained by the superposition of all spectral components of the fluorescent radiations and, if required, the laser light, too.

The white light in the sense of the above description may also comprise a desired colour hue.

The above described embodiments of devices for the generation of white light can preferably also be configured as follows: By an appropriate doping, a sufficient pumping power, and wavelength-selective mirrors (or metallising, respectively) at both ends of the optical waveguide, a so-called fibre laser can be formed such that by superposition of the radiation components of the pump laser with the fluorescent light (e.g. the optical waveguide 18 or 18') white light is emitted at the outlet. Such an arrangement is advantageous in that the fluorescent light is converted to nearly 100% in the optical waveguide 18/18'.

What is claimed is:

1. A device for the generation of white light, comprising:
at least one semiconductor laser which emits radiation in the blue and/or violet and/or ultraviolet region of the spectrum; and
at least one optical waveguide for the generation of white light, into which the radiation of the semiconductor laser is at least partially coupled, with the optical waveguide being doped with fluorescent dyes which may be excited directly or indirectly by the laser radiation in such a manner that by superposition of fluorescent radiations white light is emitted at an end of the optical waveguide, wherein the fluorescent dyes and the laser radiation are matched such that the fluorescent radiation of one of the fluorescent dyes serves as a pump light for another fluorescent dye.

2. The device according to claim 1, wherein a downstream optical waveguide is provided downstream of the optical waveguide provided for the generation of white light, said downstream optical waveguide is flexible.

3. The device according to claim 1 or 2, wherein the optical waveguide provided for the generation of white light has a diameter of less than 1000 µm.

4. The device according to claim 2, wherein the downstream connected optical waveguide has a diameter of less than 1000 µm.

5. The device according to claim 1, wherein the optical waveguide provided for the generation of white light is flexible.

6. The device according to claim 1, wherein the optical waveguide for the generation of white light is doped with a plurality of different fluorescent dyes which fluoresce in different regions of the spectrum.

7. The device according to claim 1, wherein several optical waveguides extending in parallel are provided for the generation of white light.

8. The device according to claim 7, wherein different optical waveguides are doped with different fluorescent dyes.

9. The device according to claim 1, wherein several semiconductor lasers are provided.

10. The device according to claim 1, wherein at least one of the optical waveguides is provided with a means for mixing of wave guide modes for the generating of spatially homogeneous white light.

11. The device according to claim 10, wherein the mode mixture is achieved by a polygonal shaping of the optical waveguide.

12. The device according to claim 2, wherein the downstream connected optical waveguide is adapted to illuminate an interior space of an eye.

13. The device according to claim 12, wherein the optical waveguide has a hexagonal cross-section.

14. Use of the device according to claim 1 as a white light source for illumination of an interior of an eye.

15. A device for the generation of white light, comprising:
- at least one semiconductor laser which emits a first radiation;
- at least one optical waveguide at least partially coupled to said semiconductor laser and transmissive to said first radiation;
- a first fluorescent dye disposed in said waveguide, said first fluorescent dye responsive to said first radiation to emit a second radiation; and
- a second fluorescent dye disposed in said waveguide, said second fluorescent dye responsive to said second radiation to emit a third radiation, wherein a mixture of radiations including said second and third radiations generates a white light.

16. The device of claim 15, wherein said waveguide has a first end and an opposite second end, said laser optically coupled to said waveguide adjacent to said first end and said white light emanating from said second end, said second end movable with respect to said first end.

17. The device of claim 16, wherein said waveguide includes a white light generation portion and a transmission portion having said second end, said transmission portion having a minimum diameter of less than 1000 μm.

18. The device of claim 17, wherein said waveguide includes a plurality of individual waveguides extending in substantial alignment.

19. The device of claim 15, wherein the mixture of radiations includes a portion of said first, second and third radiations.

20. A white light medical illumination system for use in medical treatment and diagnostic procedures for the human body, the device comprising:
- at least one semiconductor laser which emits a first radiation at least in part in the blue to ultraviolet region of the electromagnetic spectrum;
- an optical waveguide assembly at least partially transmissive to said first radiation, said waveguide assembly having a first end and an opposite second end, said laser optically coupled to said waveguide assembly adjacent said first end, said optical waveguide assembly flexible along at least a portion of its length between said first end and said second end;
- a first fluorescent dye disposed in at least a portion of said waveguide assembly, said first dye responsive to said first radiation to emit a second radiation; and
- a second fluorescent dye disposed in at least a portion of said waveguide assembly, said second fluorescent dye responsive to at least said second radiation to emit a third radiation, wherein a mixture of radiations including said second and third radiations generates a white light from said second end, said second end of said optical waveguide assembly having a minimum peripheral dimension of less than about 1000 μm and configured for illumination of an interior portion of the human body.

* * * * *

UNITED STATES PATENT AND TRADEMARK OFFICE
CERTIFICATE OF CORRECTION

| | | |
|---|---|---|
| PATENT NO. | : 7,020,378 B2 | |
| APPLICATION NO. | : 10/468165 | |
| DATED | : March 28, 2006 | |
| INVENTOR(S) | : Hans Poisel et al. | |

It is certified that error appears in the above-identified patent and that said Letters Patent is hereby corrected as shown below:

<u>Column 1,</u>
Line 15, "inter" should read -- interior of the human eye --.

<u>Column 4,</u>
Line 60, "generating" should read -- generation --.

Signed and Sealed this

Twentieth Day of June, 2006

JON W. DUDAS
*Director of the United States Patent and Trademark Office*